US010284510B2

(12) United States Patent
Bastide et al.

(10) Patent No.: US 10,284,510 B2
(45) Date of Patent: May 7, 2019

(54) TECHNOLOGY FOR MESSAGE DELIVERY TO SUBSCRIBERS IN A NETWORK

(71) Applicant: International Business Machines Corporation, Armonk, NY (US)

(72) Inventors: Paul R. Bastide, Boxford, MA (US); Matthew E. Broomhall, Goffstown, NH (US); Robert E. Loredo, North Miami Beach, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 266 days.

(21) Appl. No.: 15/242,237

(22) Filed: Aug. 19, 2016

(65) Prior Publication Data
US 2018/0054378 A1 Feb. 22, 2018

(51) Int. Cl.
*H04L 12/58* (2006.01)
*H04L 29/08* (2006.01)
*G06Q 50/00* (2012.01)
*G06Q 10/10* (2012.01)
(Continued)

(52) U.S. Cl.
CPC .......... *H04L 51/24* (2013.01); *G06Q 10/107* (2013.01); *G06Q 50/01* (2013.01); *H04L 51/04* (2013.01); *H04L 67/02* (2013.01); *H04L 67/22* (2013.01); *H04L 12/185* (2013.01);
(Continued)

(58) Field of Classification Search
CPC ........................ G06F 16/30867; G06Q 10/107; G06Q 50/01; H04L 51/00; H04L 51/04; H04L 51/12; H04L 51/14; H04L 51/16; H04L 51/22; H04L 51/24; H04L 51/26;
(Continued)

(56) References Cited

U.S. PATENT DOCUMENTS

| 7,548,972 B2 | 6/2009 | Belair |
| 8,161,106 B2 | 4/2012 | Quinn |
| 8,364,514 B2 | 1/2013 | Macbeth |
| (Continued) | | |

FOREIGN PATENT DOCUMENTS

WO    2013/091068 A1    6/2013

OTHER PUBLICATIONS

Dayanandan et al.; "Classifying Social Groups and Change Point Detection for Prioritizing Social Data", CINTI IEEE 12th Inter. Symposium On, Nov. 21-22, 2011, pp. 303-306.
(Continued)

*Primary Examiner* — Vivek Srivastava
*Assistant Examiner* — William C McBeth
(74) *Attorney, Agent, or Firm* — Anthony V. S. England; L. Jeffrey Kelly

(57) ABSTRACT

For message delivery in a communication network, message processing is monitored, including processing of a first message by subscribers of a network application that provides messaging services via the communication network. A group activity level is determined for processing of the first message by ones of the subscribers who belong to a first group of persons. The determined group activity level is compared to a threshold activity level for the group. Responsive to the determined group activity level exceeding the threshold activity level, a notification about the message is sent via the communication network for a subscriber who belongs to the first group and has not processed the first message.

20 Claims, 3 Drawing Sheets

(51) Int. Cl.
*H04W 4/12* (2009.01)
*H04L 12/18* (2006.01)

(52) U.S. Cl.
CPC .......... *H04L 12/1895* (2013.01); *H04L 51/32* (2013.01); *H04W 4/12* (2013.01)

(58) Field of Classification Search
CPC ......... H04L 51/32; H04L 67/02; H04L 67/22; H04W 4/12
See application file for complete search history.

(56) References Cited

U.S. PATENT DOCUMENTS

| | | | |
|---|---|---|---|
| 8,812,958 B2 | 8/2014 | Willis | |
| 8,892,489 B2 | 11/2014 | Brown | |
| 8,935,272 B2 | 1/2015 | Ganti | |
| 10,049,472 B1* | 8/2018 | Croom | H04L 67/22 |
| 2009/0138828 A1* | 5/2009 | Schultz | G06Q 10/10 |
| | | | 715/853 |
| 2012/0136866 A1* | 5/2012 | Carter | G06Q 50/01 |
| | | | 707/740 |
| 2013/0024277 A1* | 1/2013 | Tuchman | G06Q 30/0241 |
| | | | 705/14.49 |
| 2013/0041968 A1* | 2/2013 | Cohen | H04L 51/26 |
| | | | 709/206 |
| 2013/0151607 A1* | 6/2013 | Faller | G06Q 50/01 |
| | | | 709/204 |
| 2013/0325755 A1* | 12/2013 | Arquette | H04L 51/32 |
| | | | 706/12 |
| 2014/0047041 A1* | 2/2014 | O'Sullivan | H04L 51/10 |
| | | | 709/206 |
| 2014/0114770 A1* | 4/2014 | Rao | G06Q 50/01 |
| | | | 705/14.66 |
| 2014/0122622 A1* | 5/2014 | Castera | H04L 51/32 |
| | | | 709/206 |
| 2014/0172996 A1* | 6/2014 | Deeter | H04L 51/24 |
| | | | 709/206 |
| 2014/0280544 A1 | 9/2014 | Aldereguia | |
| 2014/0297772 A1* | 10/2014 | LoPorto | H04L 51/32 |
| | | | 709/206 |
| 2015/0012452 A1 | 1/2015 | Damman | |
| 2015/0019273 A1 | 1/2015 | Grosz | |
| 2015/0120588 A1 | 4/2015 | Mencke | |
| 2015/0127418 A1* | 5/2015 | Piepgrass | G06Q 50/01 |
| | | | 705/7.29 |
| 2015/0169587 A1* | 6/2015 | Silverman | G06Q 50/01 |
| | | | 707/751 |
| 2016/0048903 A1 | 2/2016 | Fujioka | |
| 2016/0147760 A1* | 5/2016 | N | G06Q 30/0244 |
| | | | 707/751 |
| 2016/0359790 A1* | 12/2016 | Zhang | H04L 51/32 |
| 2016/0359791 A1* | 12/2016 | Zhang | H04L 51/32 |

OTHER PUBLICATIONS

IP.com et al.; "Automatic Identification and Updating of Communication Groups", IPCOM000219033D, Jun. 18, 2012, pp. 1-5.
Nouh et al.; "Identifying Key-Players in Online Activist Groups on the Facebook Social Network", ICDMW IEEE International Conference on, Nov. 14-17, 2015, pp. 969-997.

* cited by examiner

TECHNOLOGY FOR MESSAGE DELIVERY TO SUBSCRIBERS IN A NETWORK

FIELD OF THE INVENTION

The field of the present invention concerns message delivery in a communication network, including message delivery to subscribers who belong to a pre-defined group of persons.

BACKGROUND

Message communication via computer systems in a communication network may be supported for subscribers by a variety of service providers and communication protocols. Examples include email message communication, which may use an IMAP, POP3, SMTP or HTTP communication protocol, for example; instant message communication, for which there are many communication protocols, including XMPP and SIP, for example; and text message communication, which may use an SMS communication protocol, for example. Proprietary protocols also exist.

SUMMARY

A method for message delivery in a communication network includes monitoring of message processing within a communication network, including processing of a first message by subscribers of a network application that provides messaging services via the communication network. A group activity level is determined for the processing of the first message by ones of the subscribers who belong to a first group of persons. The determined group activity level is compared to a threshold activity level for the group. Responsive to the determined group activity level exceeding the threshold activity level, a notification about the message is sent via the communication network to a subscriber who belongs to the first group and has not processed the message.

System and computer program products relating to the above-summarized method are also described and claimed herein.

BRIEF DESCRIPTION OF DRAWINGS

Novel features believed characteristic of the invention are set forth in the appended claims. The invention itself, however, as well as a preferred mode of use, objectives and advantages thereof, will best be understood by reference to the following detailed description of an illustrative embodiment when read in conjunction with the accompanying drawings, wherein:

DETAILED DESCRIPTION

Figure 1:
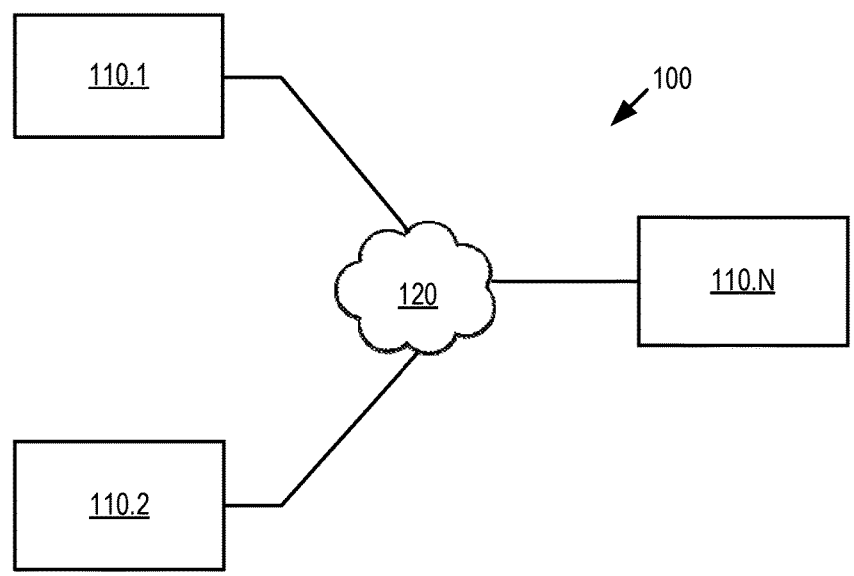
FIG. 1 illustrates a networked computer environment, according to embodiments of the present invention.

While network-based message communication enables subscribers to rapidly share information with others and gather information from others, significant messages may be inadvertently missed by a given subscriber (also referred to as "user") due to the number of messages users create, read and respond to each day. Embodiments of the present invention include a recognition that a significant message may be missed by a given user, or the given user may undesirably delay handling of the message, even though other users who are significant to the given user may receive or at least have access to the same message and may timely process the message, such as by writing a response or taking some other action that follows from the message.

More specifically, embodiments of the present invention include a recognition that information may exist that can be gathered for indicating which other users are significant to a given user, that this information about significant others can be combined with information that the given user "missed" a particular message, e.g., has not yet read or otherwise processed the message, and that this can be combined with information indicating the receipt or creation of the message by the significant other users. Further, embodiments of the present invention include a recognition that the above intelligence, once gathered, can be combined with information indicating timely processing of the message by the significant other uses who received the message, such that if practical ways can be found to obtain and combine all this information, the combination of all of this information can be used advantageously to at least generate a notification to the given user about the particular message that the given user has overlooked or at least not yet processed.

Disclosed herein are practical ways for machine-based detection and combining of the above described, complex pattern of network-based user communications for triggering machine-based actions, including notification to a user and other useful actions, according to embodiments of the present invention. Embodiments disclosed herein may be advantageous at least because message filters and custom rules, which may otherwise be used to address overloading of subscribers, for example, tend to require substantially more user effort and computing resources. That is, for example, filters and custom rules, which involve creation such as based on author, title, keyword and time, tend to be overly simple, unless the user devotes substantial time and effort to creating and maintaining filters and rules. Non-simple filters and rules also tend to take substantial computing resources, including memory and processing, as do other alternatives, such as statistical machine learning. In contrast, embodiments of the present invention, while they involve machine detection of a complex pattern of network communication, may be implemented and maintained with less user effort and computing resources than filters, custom rules and statistical-based machine learning.

Detailed embodiments of the present invention are disclosed herein to illustrate claimed structures and methods. This invention may, however, be embodied in many different forms and should not be construed as limited to the exemplary embodiments disclosed herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

FIG. 1 illustrates an example computing and network communication environment 100, according to embodiments of the present invention. As shown, environment 100 includes computer systems 110.1, 110.2 through 110.N connects via network 120, which may be public or private.

Systems 110.1, 110.2, etc. include modules, which may be program or hardware modules, configured to perform tasks for their own respective systems or for other systems or both. In various instances, message communication via network 120 may include communication via protocols for email, instant message, text message or proprietary protocols.

Figure 2:
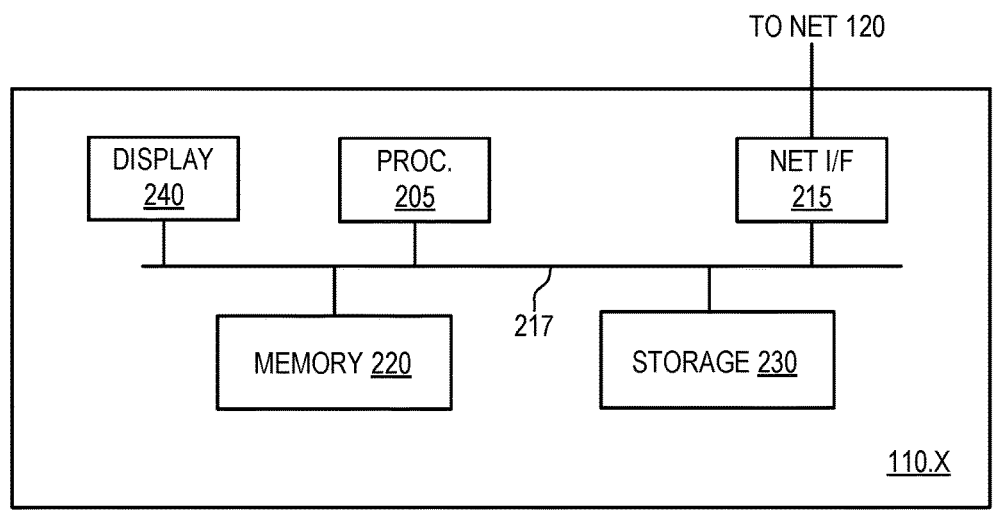
FIG. 2 is a block diagram of a computer systems suitable for systems shown in FIG. 1, according to embodiments of the present invention.

FIG. 2 illustrates details of a computer system 200 suitable as computer systems 110.1, 110.2, etc. according to embodiments of the present invention, wherein system 200 includes at least one central processing unit (CPU) 205, network interface 215, interconnect (i.e., bus) 217, memory 220, storage device 230 and display 240 where system 200 may include an icon management module 260. CPU 205 may retrieve and execute programming instructions stored in memory 220 for applications, including module 260. Similarly, CPU 205 may retrieve and store application data residing in memory 220. Interconnect 217 may facilitate transmission, such as of programming instructions and application data, among CPU 205, storage 230, network interface 215, and memory 220. CPU 205 is representative of a single CPU, multiple CPUs, a single CPU having multiple processing cores, and the like. Additionally, memory 220 is representative of a random access memory, which includes data and program modules for run-time execution, such as model builder 103, according to embodiments of the present invention. It should be understood that system 200 may be implemented by other hardware and that one or more modules thereof may be firmware.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The host may provide a suitable website or other internet-based graphical user interface accessible by users. In one embodiment, Netscape web server, IBM® Websphere® Internet tools suite, an IBM DB2, universal database platform and a Sybase database platform are used in conjunction with a Sun Solaris operating system platform. (IBM and WebSphere are trademarks of International Business Machines Corporation, registered in many jurisdictions worldwide.) Additionally, components such as JBDC drivers, IBM connection pooling and IBM MQ series connection methods may be used to provide data access to several sources. The term webpage as it is used herein is not meant to limit the type of documents and applications that might be used to interact with the user. For example, a typical website might include, in addition to standard HTML documents, various forms, Java applets, Javascript, active server pages (ASP), Java Server Pages (JSP), common gateway interface scripts (CGI), extensible markup language (XML), dynamic HTML, cascading style sheets (CSS), helper applications, plug-ins, and the like.

Figure 3:
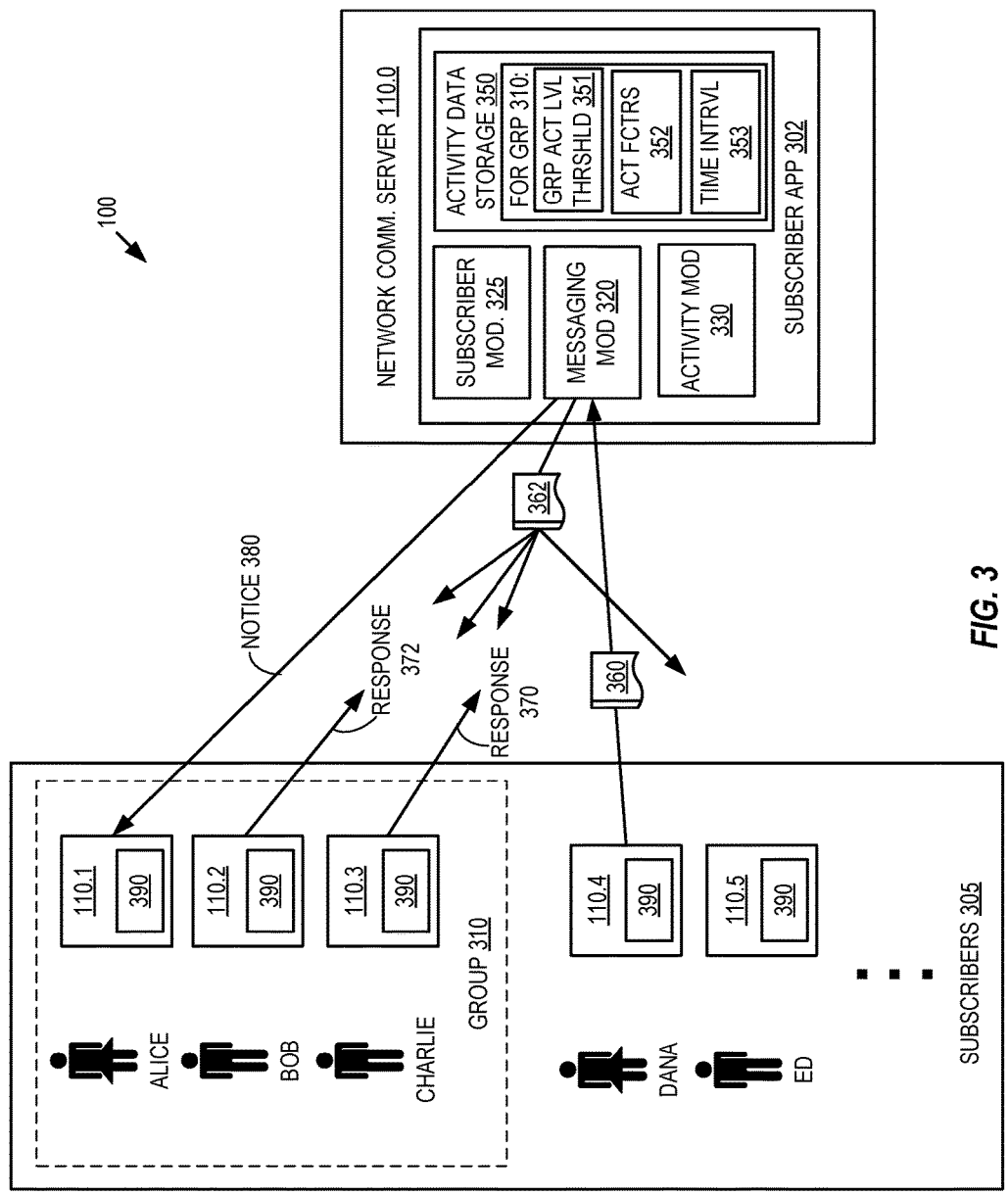
FIG. 3 illustrates additional aspects of the computing environment of FIGS. 1 and 2, according to embodiments of the present invention.

Referring to FIG. 3, additional aspects are illustrated for computing environment 100 of FIG. 1, according to embodiments of the present invention. A network communication server 110.0 includes a messaging module 320 of a subscriber application 302, where messaging module 320 is configured for receiving, recording and distributing messages composed by subscribers 305 and for distributing the messages among the subscribers 305. For example, messaging module 320 in the illustrated instance receives message 360 composed via computing device 110.4 by Dana, who is a social net number 305, and distributes the message 362 to other subscribers 305, including Alice, Bob, Charlie and Ed, as illustrated. Messaging module 320 may record message 360 in local storage, for example, such as storage 230 (FIG. 2) of server 110.0, or in remote storage.

Messaging module 320 is also configured for receiving, recording and distributing responses composed by subscribers 305, i.e., responses to messages such as message 360. A response to a message may include at least one of replying directly to the sender, which is common if the message is a personal communication, for example; retweeting or otherwise sharing the message; liking or otherwise recommending the message; and commenting upon the message, for example, which is common if the message is posted in a message stream or wall or the like.

In the illustrated instance, as an example, messaging module 320 receives response 370 (a "like," for example) composed via computing device 110.3 by Charlie, who is a subscriber 305 and also a member of a group 310 of a social network. For example, group 310 may be a social networking group for software engineers in the illustrated instance. In one or more embodiments of the present invention, subscriber application 302 may be, or may include, the social networking application. Alternatively, subscriber application 302 may be, or may include, a different network communication application, such as an email application, and subscriber module 325 may query a different application to determine groups to which recipients of message 360 belong, such as a social networking application, which may be on the same network communication server 110.0 or a different server. In some embodiments, this may be facilitated by subscribers 305 providing authentication for other applications to subscriber module 320, such as providing authentication for the social networking application in the current example. This may be done in an initialization process prior to sending or receiving any messages, or may be done later in order to facilitate determination of group memberships, etc.

In the illustrated instance, messaging module 320 also receives responses 372 (such as a "like" and a comment, for example) composed via computing device 110.2 by Bob, who is also a subscriber 305 and a member of group 310.

Application 302 also includes a subscriber module 325 in the illustrated instance, which is configured to receive and record enrollment of subscribers 305, which includes recording subscriber personal profiles and which subscribers are enrolled in which groups, such as subscribers Alice (system 110.1), Bob (system 110.2) and Charlie (system 110.3) in illustrated group 310. In the illustrated instance, Ed (system 110.5) and Dana (system 110.4) are not members of a group, although Ed and Dana are subscribers 305.

In embodiments of the present invention, messages are, in essence, group curated. For this purpose, an activity module 330 is provided for subscriber application 302 on server 110.0, which may be local to server 110.0, as illustrated, or may be remote, and which may be closely integrated with application 302, as illustrated, or may communicate from outside application 302, such as via an application programming interface (not shown), for example. Also an activity data storage space 350 is provided, which may be local to server 110.0 (e.g., in storage 230 of FIG. 2), as illustrated, or may be remote and, likewise, may be closely integrated with application 302 or may exchange data from outside application 302.

Figure 4:
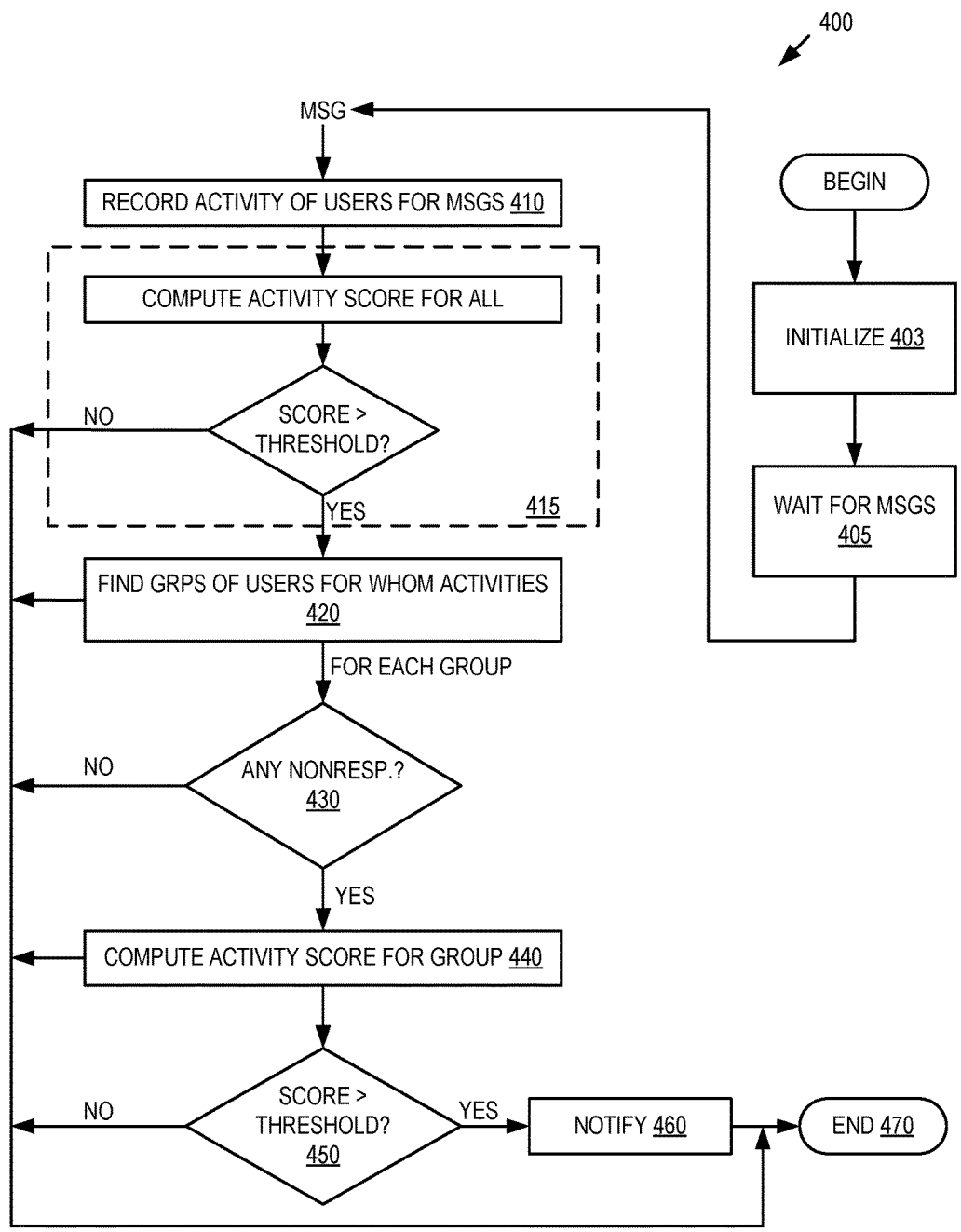
FIG. 4 illustrates computer system based actions in the computing environment of FIGS. 1 through 3, according to embodiments of the present invention.

Referring now to FIGS. 3 and 4, a flow chart 400 is shown illustrating actions performed for at least notifying a subscriber 305 about a message within application 302, such as illustrated message 360, according to embodiments of the present invention. Activity module 330 is configured for performing an initialization process 403 for each group of application 302. According to embodiments of the present invention, a user (subscriber 305) of each group, such as group 310, for example, interacts with group initialization process 403 for the respective group, wherein the subscriber 305 communicates initial group settings to activity module 330, including activity factors 360, at least one-time interval 353 and a group activity level threshold 351, which activity module 330 stores in repository 350. Generally, the user defines values to different processing activities wherein the values are smaller for processing activities that indicate less engagement of a user with a message, and, conversely, the values are larger for processing activities that indicate more engagement of a user with a message. For example, the activity values may be smaller for merely reading a message, a little larger for liking or otherwise recommending a message, a little larger for commenting upon a message, a little larger for sharing a message, and a little larger for replying solely and directly to the sender. However, different users and groups may value different processing activities differently. It is arguable, for example, that replying solely and directly to the sender indicates less user engagement or user value for a message than does sharing the message with others. In one or more alternative embodiments of the present invention, initialization process 403 assigns default initial group settings for a group automatically or in response to a user indicating that the user wants to use default settings.

After initialization 403, activity module 330 waits 405 for notice about messages from messaging module 320. Then, when subscribers 305 generate messages in social networking application 302, messaging module 320 communicates with activity module 330, passing messaging data to activity module 330 for activity module 330 to record activities of other subscribers 305 who act in response to the messages. This includes passing to activity module 330 specifically each response, if any, each other subscriber 305 performs regarding each message, such as a reply directly to the sender, a retweet or other sharing of the message, a "like" or other recommendation of the message, or a comment upon the message, so that activity module 330 can record 410 this in repository 350.

Application 302 configures messages 360 and responses 370 and 372 such that they include unique identification for each message and response, which includes identification showing a response is associated with the message to which it responds. Further, application 302 configures messages and responses such that they include subscriber 305 identification, which indicates which subscriber generates or responds to which message. Consequently, messaging module 320 sends activity module 330 unique identifications of respective messages and responses and, for each message and response, sends activity module 330 unique identifications showing which subscriber's activities are for which messages.

Responsive to one or more responses occurring for a given message, activity module 330 queries subscriber module 325 of social networking application 302 to determine, for subscribers who responded, groups to which the responding subscribers belong. That is, activity module 330 notifies subscriber module 325 of the identify of subscribers 305 who responded for a given message during a predetermined time interval after occurrence of the message, so that subscriber module 325 may identify groups to which those subscribers belong.

Responsive to receiving an answer 420 to such a query for a given message from subscriber module 325, that is, identities of groups to whom subscribers belong who responded to the message, including which subscribers belong to which groups, activity module 330 determines 430 for each group whether all members of the respective group responded, i.e., whether any member did not respond. More generally, activity module 330 determines which members did and did not respond for a given group. For any group in which all members responded, activity module 330 branches to end 470.

For any group in which at least one member did not respond, activity module 330 computes 440 group activity level for that particular group (also referred to as a "group activity score"). Upon determining a group activity score for a particular message and a particular group, activity module 330 retrieves the predefined group activity level threshold 351 and compares it to the computed group activity score for the current message to determine at 450 whether the computed activity score exceeds the predetermined group activity level threshold 351. If the current score for the group does not exceed the predetermined group activity threshold 351, activity module 330 branches to end 470 for that particular message. However, if the current score for the group does exceed the predetermined group activity threshold 351, activity module 330 signals messaging module 320 to notify 460 those members of the given group who did not respond to the given message.

In one instance, for example, for group 310 initialization, Bob defined an activity factor 352 of "1" for "liking" a message, an activity factor 352 of "3" for replying to, sharing or commenting upon a message, a time interval 353 of one hour, and a group activity level threshold 351 of "4." When activity module 330 computes 440 the group 310 activity score, responses 370 and 372 have occurred during the one-hour time interval, as shown in FIG. 3, so that activity module 330 computes a group activity score of 1+1+3=5, i.e., 1 for the "like" of response 370, 1 for the "like" of response 372 and 3 for the comment of response 372. Since the score of 5 exceeds the group activity level threshold 351 of 4, activity module 330 signals messaging module 320 to send a notice 380 to those members of the given group who did not respond to the given message, which is Alice in this instance.

In one or more embodiments of the present invention, notices such as 380 are presented in a manner that drives user attention. For example, a notification space 390 is provided for each user's view of application 302, wherein message 320 module of application 302 presents activity-level-based notices in space 390, such as notice 380 about message 360 to Alice described herein above, in space 390. In one such embodiment, notices are presented in chronological order according to when a given message, was originally sent, e.g., by the date when Dana sent message 360 in the illustrated instance. In one or more embodiments, notices such as 380 are presented in a manner that even further drives user attention. For example, messaging module 320 of application 302 presents activity-level-based notices in order of each message's group activity level score.

Presentations such as describe above may include rearranging the order of notices when notices for new messages are generated. For example, if a new notice 380 is sent to a user 305 for a message and the notice 380 is for a message having a higher group activity score than notices already presented to the user, then messaging module 320 presents the new notice 380 at the top of the list in notification space 390.

There may also be a baseline activity level threshold, according to embodiments of the present invention, wherein activity module 330 is also configured for initialization 403 to include performing global initialization for application 302. According to embodiments of the present invention, an administrator for application 302 performs the global initialization process, in which the administrator communicates initial global settings to activity module 330, including activity factors 352, at least one-time interval 353 and a baseline, i.e., global, activity level threshold 351, which activity module 330 stores in repository 350. In an embodiment of the present invention, activity module 330 computes a baseline activity level (also referred to as a "baseline activity score" or "all user activity score" or "global activity score," or "baseline activity level," or "all user activity level" or "global activity level," etc.) for a given message based on the specific responses of all the members who responded to the message during the predetermined time interval, which activity module 330 does at action 415 prior to proceeding to action 420. Activity module 330 only proceeds to action 420, where it queries subscriber module 325, if a certain predetermined, baseline threshold activity level 351 is exceeded within the predetermined time interval.

In one instance, for example, the administrator defines an activity factor 352 of "0.5" for "liking" a message, an activity factor 352 of "2" for replying to, sharing or commenting upon a message, a time interval 353 of an hour, and a baseline activity level threshold 351 of "2.5." When activity module 330 computes 440 the baseline activity score, responses 370 and 372 have occurred during the one-hour time interval, as shown in FIG. 3, so that activity module 330 computes a baseline activity score of 0.5+0.5+2=3, i.e., 0.5 for the "like" of response 370, 0.5 for the "like" of response 372 and 2 for the comment of response 372. Since the score of 3 exceeds the baseline activity level threshold 351 of 2.5, activity module 330 proceeds to action 420, wherein activity module 330 queries subscriber module 325. If, for example, the administrator had defined an activity factor 352 of "0.5" for "liking" a message, an activity factor 352 of "1," a baseline activity level threshold 351 of "2.5," and if responses 370 and 372 occurred during the one hour time interval, as shown in FIG. 3, then activity module 330 would have computed a baseline activity score of 0.5+0.5+1=2, which would not exceed baseline activity level threshold 351 of "2.5," so that activity module 330 would have branched to end 470, instead of proceeding to action 420, etc.

According to various embodiments of the present invention, initialization 403 may include activity module 330 receiving from a member of group 310 (and then applying) different activity factors 352, time intervals 370 and group activity level thresholds 351 for different circumstances, such as, for example i) one set of activity factors 352, time interval(s) 370 and group activity level threshold(s) 351 for group 310 regarding messages originating from a subscriber 305 who is a member of group 310 and ii) a different set of activity factors 352, time interval(s) 370 and group activity level threshold(s) 351 for group 310 regarding messages originating from a social network application 302 subscriber 305 who is not a member of group 310. Accordingly, for such an embodiment of the invention, action 440 includes determining whether the message for which an activity score is computed for group 310 originated from a member of group 310 or not, and accordingly includes applying the applicable activity factors 352. Further, for such an embodiment of the invention, action 450 includes applying the applicable group activity level threshold(s) 351.

More generally, a user 305 may define one set of activity factors 352, time interval(s) 370 and group activity level threshold(s) 351 for a group 310 regarding one kind of message within a single social networking application 302 and a different set of activity factors 352, time interval(s) 370 and group activity level threshold(s) 380 for a different kind of message within a single social networking application 302. Accordingly, for such an embodiment of the invention, action 440 includes determining the kind of message applying the applicable activity factors 352 for activity score computation 440. Further, for such an embodiment of the invention, action 450 includes applying the applicable group activity level threshold(s) 351 for the kind of message. Examples of different kinds of messages within a single social networking application 302 include relevant news items for the group, personal updates such as birthday wishes, and business-action items. For employees, examples include completing yearly validations for security and business needs (which often get lost).

As compared to other methods of filtering and notification, users may establish what they want to see, thus avoiding missed views of messages.

Other examples of actions that may be triggered by the group activity score exceeding the group activity level threshold 351 include rerouting notice 380 to another medium such as text message, email or an alternative social network. That is, it should be appreciated that messaging module 320 may send notice 380 to a different application than subscriber application 302. In the example described further above for FIG. 3, messaging module 330 sends notice 380 to Alice. However, messaging module 330 may, instead or in addition, send notice 380 to Alice via the social networking application, for example. In some embodiments, this may be facilitated by subscribers 305 providing authentication for other applications to subscriber module 320, such as providing authentication for the social networking application in the current example.

It should also be appreciated that in one or more embodiments of the present invention, messaging module 330 may send notice 380 and message 362 (i.e., an instance of message 360) to a subscriber 305. Note that a subscriber may also be referred to as a member in some applications 302, particular where application 302 includes social networking service aspects.

The structures and processes disclosed herein may be used with collaboration systems, project management and social systems, including, for example, social networking, asynchronous networks (e.g., "I Follow" types of networks, like Twitter, etc.), synchronous networks (e.g., "I Connect" types of networks, like IBM Connections, etc.), email (e.g., IBM Notes/Domino, Microsoft Exchange, Google Mail, etc.), real time instant messaging (e.g., Persistent Chat, IBM SameTime, etc.), other instant messaging (e.g., IBM SameTime, etc.), wiki networks (e.g., IBM Connections Wiki, Confluence Wiki, etc.) and other product/task systems (e.g., Rational Team Concert, Microsoft Project, etc.). The structures and processes disclosed herein may be used with instant messaging (IM), short message services (SMS), blogs, web sites, communities (such as, for example, LinkedIn and Facebook), news feeds, emails, VoIP, software phones (such as, for example, Skype and Google Voice), and etc.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Those skilled in the art having read this disclosure will recognize that changes and modifications may be made to the embodiments without departing from the scope of the present invention.

It should be appreciated that the particular implementations shown and described herein are illustrative of the invention and its best mode and are not intended to otherwise limit the scope of the present invention in any way. Other variations are within the scope of the following claims.

The actions recited in the claims can be performed in a different order and still achieve desirable results. Likewise, the processes depicted in the accompanying figures do not necessarily require the particular order shown, or sequential order, to achieve desirable results. In certain implementations, multitasking and parallel processing can be advantageous.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for message delivery in a communication network, the method comprising:
    monitoring message processing, including processing of a first message by subscribers of a network application that provides messaging services via the communication network, where the first message is addressed to a plurality of subscribers including a first subscriber;
    determining a first activity level for processing of the first message by the plurality of subscribers;
    determining membership of the first subscriber in at least one predefined group of a social networking application;
    comparing the determined first activity level to a first threshold activity level and, in response to the first activity level exceeding the first threshold activity level, determining a second activity level for processing of the first message by only those of the plurality of subscribers who are members of the at least one predefined group; and
    sending via the communication network, responsive to the determined second activity level exceeding a second threshold activity level and responsive to the first subscriber having not processed the first message, a notification to the first subscriber about the first message.

2. The method of claim 1, wherein the determining the second activity level for the processing of the first message by only those of the plurality of subscribers who are members of the at least one predefined group comprises:
 determining a number of subscribers who are members of the at least one predefined group and who processed the first message within a predefined time interval and a type of message processing performed by each of the subscribers who are members of the at least one predefined group and who processed the first message.

3. The method of claim 1, wherein the determining the second activity level for the processing of the first message by only those of the plurality of subscribers who are members of the at least one predefined group comprises:
 applying, for each subscriber who is a member of the at least one predefined group and who processed the first message within a predefined time interval, an activity value assigned to a type of message processing performed by the respective subscriber.

4. The method of claim 1, where the determining membership of the first subscriber in the at least one predefined group of the social networking application is performed in response to the first activity level exceeding the first threshold activity level.

5. The method of claim 1, wherein the network application is an email application, and the second activity level measures activity in the social networking application of the plurality of subscribers who are members of the at least one predefined group.

6. The method of claim 1, wherein the monitoring of message processing includes monitoring types of message processing, the types of message processing including recommending the first message, commenting on the first message, and viewing the first message.

7. The method of claim 1, the method further comprising:
 monitoring message processing of at least a second message by the subscribers of the network application, where the second message is addressed to at least the first subscriber;
 determining a first activity level for processing of the second message;
 comparing the determined first activity level for the processing of the second message to the first threshold activity level and, in response to the first activity level for the processing of the second message exceeding the first threshold activity level, determining a second activity level for processing of the second message;
 sending via the communication network, responsive to the determined second activity level for processing of the second message exceeding the second threshold activity level and responsive to the first subscriber having not processed the second message, a notification to the first subscriber about the second message; and
 presenting, to the first subscriber, the notifications about the respective messages in order of respective second activity levels determined for the respective messages.

8. A system for message delivery in a communication network, the system comprising:
 a processor; and
 a computer readable storage medium connected to the processor, wherein the computer readable storage medium has instructions stored thereon for controlling the processor to perform operations comprising:
 monitoring message processing, including processing of a first message by subscribers of a network application that provides messaging services via the communication network, where the first message is addressed to a plurality of subscribers including a first subscriber;
 determining a first activity level for processing of the first message by the plurality of subscribers;
 determining membership of the first subscriber in at least one predefined group of a social networking application;
 comparing the determined first activity level to a first threshold activity level and, in response to the first activity level exceeding the first threshold activity level, determining a second activity level for processing of the first message by only those of the plurality of subscribers who are members of the at least one predefined group; and
 sending via the communication network, responsive to the determined second activity level exceeding a second threshold activity level and responsive to the first subscriber having not processed the first message, a notification to the first subscriber about the first message.

9. The system of claim 8, wherein the determining the second activity level for the processing of the first message by only those of the plurality of subscribers who are members of the at least one predefined group comprises:
 determining a number of subscribers who are members of the at least one predefined group and who processed the first message within a predefined time interval and a type of message processing performed by each of the subscribers who are members of the at least one predefined group and who processed the first message.

10. The system of claim 8, wherein the determining the second activity level for the processing of the first message by only those of the plurality of subscribers who are members of the at least one predefined group comprises:
 applying, for each subscriber who is a member of the at least one predefined group and who processed the first message within a predefined time interval, an activity value assigned to a type of message processing performed by the respective subscriber.

11. The system of claim 8, where the determining membership of the first subscriber in the at least one predefined group of the social networking application is performed in response to the first activity level exceeding the first threshold activity level.

12. The system of claim 8, wherein the network application is an email application, and the second activity level measures activity in the social networking application of the plurality of subscribers who are members of the at least one predefined group.

13. The system of claim 8, wherein the monitoring of message processing includes monitoring types of message processing, the types of message processing including recommending the first message, commenting on the first message, and viewing the first message.

14. The system of claim 8, the instructions controlling the processor to perform operations further comprising:
 monitoring message processing of at least a second message by the subscribers of the network application, where the second message is addressed to at least the first subscriber;
 determining a first activity level for processing of the second message;
 comparing the determined first activity level for the processing of the second message to the first threshold activity level and, in response to the first activity level for the processing of the second message exceeding the first threshold activity level, determining a second activity level for processing of the second message;

sending via the communication network, responsive to the determined second activity level for processing of the second message exceeding the second threshold activity level and responsive to the first subscriber having not processed the second message, a notification to the first subscriber about the second message; and presenting, to the first subscriber, the notifications about the respective messages in order of respective second activity levels determined for the respective messages.

15. A computer program product for curating a message, including a computer readable storage medium having instructions stored thereon for execution by a computer system, wherein the instructions, when executed by the computer system, cause the computer system to implement a method comprising:

monitoring message processing, including processing of a first message by subscribers of a network application that provides messaging services via the communication network, where the first message is addressed to a plurality of subscribers including a first subscriber;

determining a first activity level for processing of the first message by the plurality of subscribers;

determining membership of the first subscriber in at least one predefined group of a social networking application;

comparing the determined first activity level to a first threshold activity level and, in response to the first activity level exceeding the first threshold activity level, determining a second activity level for processing of the first message by only those of the plurality of subscribers who are members of the at least one predefined group; and sending via the communication network, responsive to the determined second activity level exceeding a second threshold activity level and responsive to the first subscriber having not processed the first message, a notification to the first subscriber about the first message.

16. The computer program product of claim 15, wherein the determining the second activity level for the processing of the first message by only those of the plurality of subscribers who are members of the at least one predefined group comprises:

determining a number of subscribers who are members of the at least one predefined group and who processed the first message within a predefined time interval and a type of message processing performed by each of the subscribers who are members of the at least one predefined group and who processed the first message.

17. The computer program product of claim 15, wherein the determining the second activity level for the processing of the first message by only those of the plurality of subscribers who are members of the at least one predefined group comprises:

applying, for each subscriber who is a member of the at least one predefined group and who processed the first message within a predefined time interval, an activity value assigned to a type of message processing performed by the respective subscriber.

18. The computer program product of claim 16, where the determining membership of the first subscriber in the at least one predefined group of the social networking application is performed in response to the first activity level exceeding the first threshold activity level.

19. The computer program product of claim 15, wherein the monitoring of message processing includes monitoring types of message processing, the types of message processing including recommending the first message, commenting on the first message, and viewing the first message.

20. The computer program product of claim 15, the method implemented by the instructions further comprising:

monitoring message processing of at least a second message by the subscribers of the network application, where the second message is addressed to at least the first subscriber;

determining a first activity level for processing of the second message;

comparing the determined first activity level for the processing of the second message to the first threshold activity level and, in response to the first activity level for the processing of the second message exceeding the first threshold activity level, determining a second activity level for processing of the second message;

sending via the communication network, responsive to the determined second activity level for processing of the second message exceeding the second threshold activity level and responsive to the first subscriber having not processed the second message, a notification to the first subscriber about the second message; and presenting, to the first subscriber, the notifications about the respective messages in order of respective second activity levels determined for the respective messages.

* * * * *